United States Patent
Kim et al.

(10) Patent No.: US 8,176,504 B2
(45) Date of Patent: May 8, 2012

(54) CLAMPING DEVICE FOR DISK

(75) Inventors: Nam Seok Kim, Gyunggi-do (KR);
Kyung Seob Shin, Gyunggi-do (KR);
Pyo Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 451 days.

(21) Appl. No.: 12/382,357

(22) Filed: Mar. 13, 2009

(65) Prior Publication Data

US 2010/0146525 A1   Jun. 10, 2010

(30) Foreign Application Priority Data

Dec. 10, 2008 (KR) .................. 10-2008-0125092

(51) Int. Cl.
*G11B 17/03* (2006.01)
*G11B 17/04* (2006.01)
*G11B 33/02* (2006.01)

(52) U.S. Cl. ...................................... 720/604
(58) Field of Classification Search .............. 720/604
See application file for complete search history.

(56) References Cited

U.S. PATENT DOCUMENTS

| | | | | |
|---|---|---|---|---|
| 5,956,315 A | * | 9/1999 | Sawai et al. | 720/708 |
| 6,208,613 B1 | * | 3/2001 | Iizuka | 720/707 |
| 2007/0200465 A1 | * | 8/2007 | Shiga | 310/67 R |
| 2007/0277189 A1 | * | 11/2007 | Yasumoto et al. | 720/710 |
| 2009/0064212 A1 | * | 3/2009 | Ito et al. | 720/604 |

FOREIGN PATENT DOCUMENTS

JP  2008-97706    4/2008
KR  10-2004-0080654  9/2004

* cited by examiner

*Primary Examiner* — Hoai V Ho
*Assistant Examiner* — Min Huang (57) ABSTRACT

Disclosed herein is a disk clamping device capable of preventing the slipping or eccentricity of an optical disk when it rotates at high speeds. The disk clamping device includes a turntable having a hub which is integrally provided in a central portion thereof and inserted into a central hole of an optical disk. A guide unit is accommodated in the turntable in such a way as to move linearly, and at least portion of the guide unit protrudes outwards from the hub and is supported 0by the optical disk. The guide unit is moved linearly by mounting force of the optical disk. A spring is provided in the turntable to elastically bias the guide unit in a direction opposite to a direction of insertion of the optical disk. A chucking plate presses the upper surface of the optical disk, thus securing the optical disk to the turntable.

16 Claims, 9 Drawing Sheets

Prior Art

CLAMPING DEVICE FOR DISK

CROSS REFERENCE TO RELATED APPLICATION(S)

This application claims the benefit of Korean Patent Application No. 10-2008-0125092, filed on Dec. 10, 2008, entitled "clamping device for a disk", which is hereby incorporated by reference in its entirety into this application.

BACKGROUND OF THE INVENTION

1. Field of the Invention

The present invention relates generally to a disk clamping device for holding an optical disk firmly and, more particularly, to a disk clamping device which is capable of preventing the slipping or eccentricity of an optical disk when the optical disk rotates at high speeds.

2. Description of the Related Art

Generally, in an optical disk device for recording and reproducing data on an optical disk such as a compact disk (CD), a digital versatile disk (DVD) or a blu-ray disk (BD), a portable device occupies an important part in a related industrial field and has been developed to record/reproduce data at high density and high speeds as the amounts of data which are used increases, and to increase the convenience of transportation in order to improve on the degree of time and spatial freedom for demand for data.

One of the important features of the optical disk device is to prevent the slipping of the optical disk when it rotates at high speeds, and to prevent the eccentricity of the optical disk when the optical disk is mounted.

Figure 9:
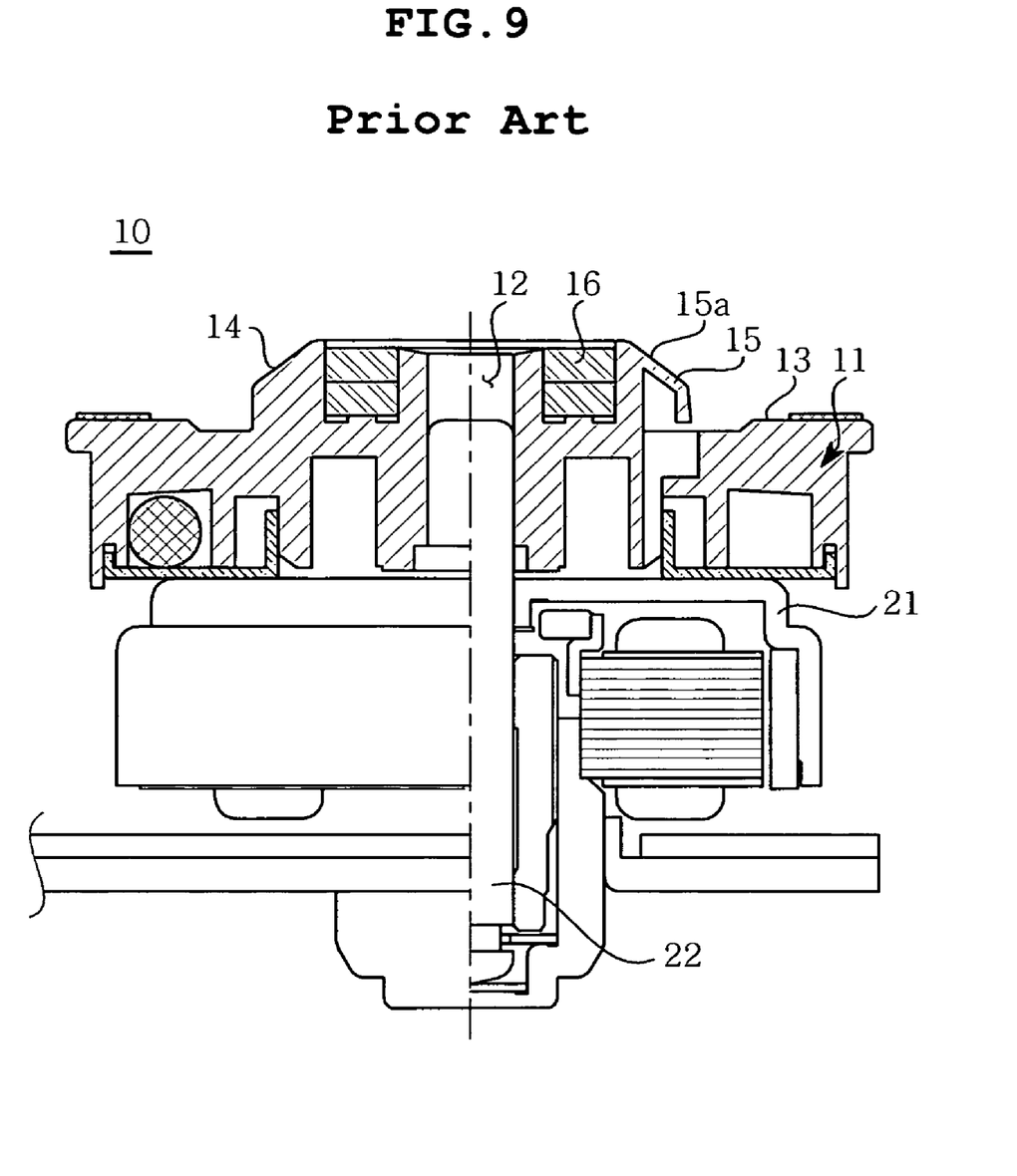
FIG. 9 is a schematic sectional view illustrating a spindle motor equipped with a conventional disk clamping device.

One example of a conventional clamping device for attaching and detaching an optical disk is schematically shown in FIG. 9.

As shown in FIG. 9, the conventional clamping device 10 includes a housing 11, a clamping magnet 16 and a claw part 15.

The housing 11 is used to seat an optical disk (not shown), and is seated on a rotor casing 21 of a spindle motor in such a way as to be secured to a rotating shaft 22. Here, a shaft insert hole 12 is formed in the central portion of the housing 11 so that the rotating shaft 22 is inserted into the shaft insert hole 12, and a seat 13 on which the optical disk is to be seated extends perpendicular to the rotating shaft 22. Further, the housing 11 is constructed so that a hub 14 which is to be inserted into the central hole of the optical disk protrudes from the center of the seat 13. The claw part 15 is integrally provided on the hub 14 to guide the insertion of the optical disk.

The clamping magnet 16 generates attractive force with respect to a chucking part (not shown) which presses the upper portion of the optical disk seated on the seat 13 of the housing 11 to hold the optical disk. The clamping magnet 16 is provided on the upper portion of the hub 14 of the housing 11 in such a way as to be adjacent to the rotating shaft 22.

The claw part 15 functions to guide the optical disk which is to be seated on the housing 11 and is integrally provided on the hub 14 of the housing 11. The claw part 15 is formed in the shape of a claw in such a way as to be elastically deformed towards the inside portion of the housing 11, that is, towards the rotating shaft 22. That is, the claw part 15 has on its upper portion an inclined surface 15a to guide the optical disk.

In the case of mounting the optical disk to the clamping device 10 constructed as described above, the hub 14 of the housing 11 is inserted into the central hole of the optical disk, and the optical disk is seated on the seat 13 of the housing 11.

At this time, in order to guide the insertion of the optical disk, the inclined surface 15a of the claw part 15 is in contact with the central hole of the optical disk.

That is, the claw part 15 guides the optical disk to be seated on the housing 11 such that the eccentricity of the optical disk is prevented.

However, in the conventional clamping device 10, the claw part 15 is designed to be elastically deformed towards the inside portion of the housing 11. Thus, when the housing 11 rotates at high speeds, the optical disk elastically deforms the claw part 15, so that the optical disk slips, thus causing the eccentricity of the optical disk.

That is, in the case of using an optical recording medium such as a DVD which requires high-speed rotation and low eccentricity, the eccentricity or slipping of the optical recording medium must be prevented.

SUMMARY OF THE INVENTION

The present invention has been made in an effort to provide a disk clamping device, which guides an optical disk such that it is placed at a predetermined position, and continuously applies elastic force to the optical disk secured at the predetermined position, thus preventing the slipping or eccentricity of the optical disk when it rotates at high speeds.

In a disk clamping device according to an embodiment of the present invention, a turntable has a hub which is integrally provided in a central portion thereof and inserted into a central hole of an optical disk. A guide unit is accommodated in the turntable in such a way as to move linearly, at least portion of the guide unit protrudes outwards from the hub and supported by the optical disk, and the guide unit is moved linearly by mounting force of the optical disk. A spring is provided in the turntable to elastically bias the guide unit in a direction opposite to a direction of insertion of the optical disk. A chucking plate presses the upper surface of the optical disk seated on the turntable, thus securing the optical disk to the turntable.

At least portion of the guide unit is in point or line contact with the turntable so as to reduce frictional force between the guide unit and the turntable when the guide unit is moved linearly by the optical disk.

According to an embodiment of the present invention, the turntable includes a coupling holder, an inner wall and a cover. The coupling holder is secured to a rotating shaft of a spindle motor. The inner wall is provided to be spaced apart from the coupling holder, and a guide hole is formed between the inner wall and the coupling holder so that the guide unit is inserted into the guide hole. The cover seals the lower portion of the turntable. The inner wall is in point or line contact with the guide unit, thus reducing frictional force.

The guide unit includes a ring-shaped body part inserted into the guide hole, and a support part provided perpendicularly to the body part, at least portion of the support part protruding out of the hub to support the optical disk. The body part includes a projection which protrudes from the outer circumference of the body part and is in point or line contact with the inner wall of the turntable.

According to another embodiment of the present invention, the turntable includes a coupling holder, an inner wall and a cover. The coupling holder is secured to a rotating shaft of a spindle motor. The inner wall is provided to be spaced apart from the coupling holder, and a guide hole is formed between the inner wall and the coupling holder so that the guide unit is inserted into the guide hole. The cover seals the lower portion of the turntable. The coupling holder is in point or line contact with the guide unit, thus reducing frictional force.

The guide unit includes a ring-shaped body part inserted into the guide hole, and a support part provided to be perpendicular to the body part, at least portion of the support part protruding out of the hub to support the optical disk. The support part includes a projection which protrudes from an inner surface of the support part and is in point or line contact with the coupling holder of the turntable.

The support part includes an inclined part which protrudes out of the hub to support the optical disk, the inclined part including a first inclined surface inserted into the central hole of the optical disk, and a second inclined surface extending from the first inclined surface in such a way as to be in close contact with a portion of the lower surface of the optical disk.

The second inclined surface of the inclined part continuously applies elastic force of the spring to the optical disk which is pressed by the chucking plate and mounted to the turntable.

The projection is formed in such a way as to extend in an axial direction of the rotating shaft.

The support part comprises a plurality of support parts which are placed at regular intervals around the rotating shaft, and the hub includes openings which are formed at regular intervals to correspond to the support parts, so that the support parts protrude out of the hub through the openings.

The plurality of support parts comprises at least three support parts which are placed around the rotating shaft at regular intervals.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Hereinafter, disk clamping devices according to the preferred embodiments of the present invention will be described in detail with reference to the accompanying drawings.

Figure 1:
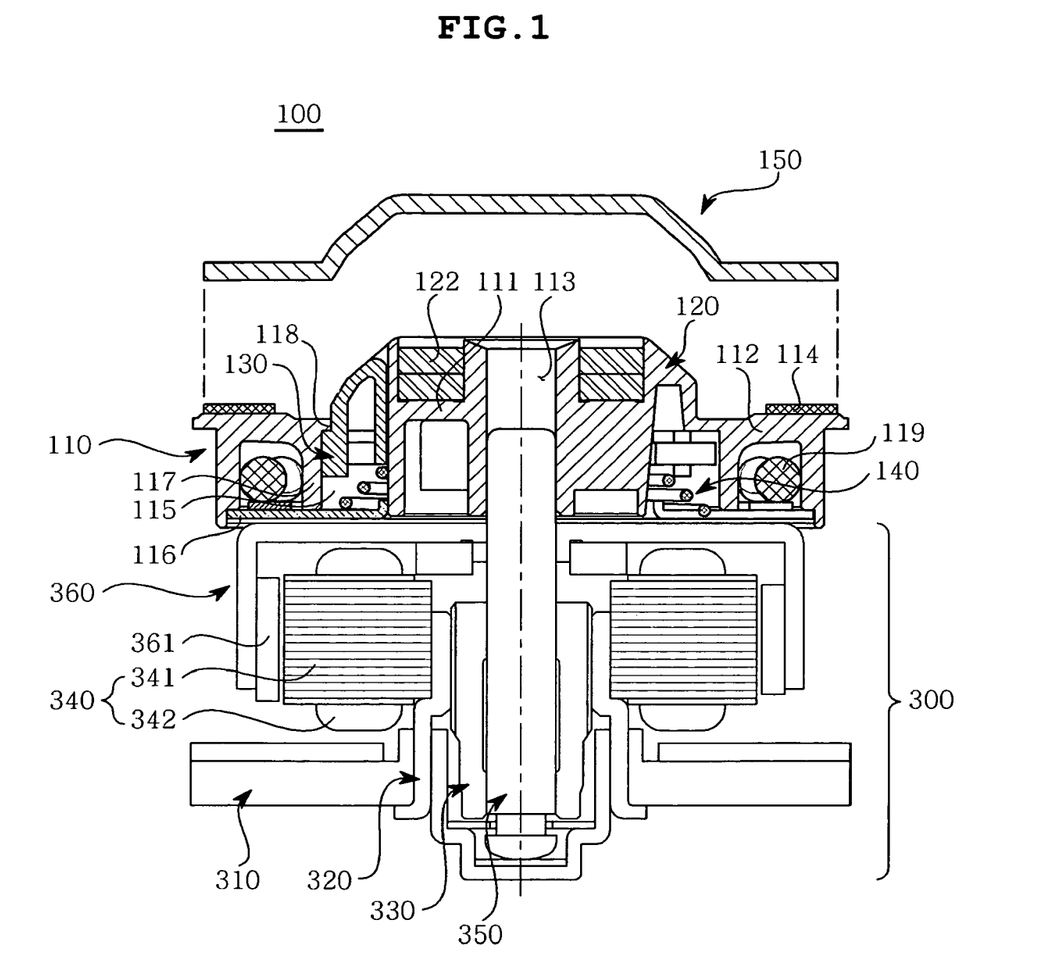
FIG. 1 is a schematic sectional view illustrating a spindle motor equipped with a disk clamping device according to a first embodiment of the present invention.

As shown in FIG. 1, the disk clamping device 100 according to the first embodiment of the-present invention is integrally provided on a spindle motor 300, and prevents the removal of an optical disk 160 when the spindle motor 300 rotates at high speeds.

The spindle motor 300 functions to rotate and drive the optical disk 160 mounted thereon, and includes a base 310, a bearing holder 320, a bearing 330, an armature 340, a rotating shaft 350 and a rotor casing 360.

The base 310 functions to support the whole portion of the spindle motor 300, and is secured to a device such as a hard disk drive in which the spindle motor 300 is installed. The bearing holder 320 has the shape of a hollow cylinder to support the bearing 330, and an end of the bearing holder 320 is secured to the base 310 through caulking or spinning. The bearing 330 serves to rotatably support the rotating shaft 350 and is installed such that the central axis of the bearing 330 is coaxial with the central axis of the rotating shaft 350.

The armature 340 forms an electric field when external power is applied to the armature 340, and includes a core 341 and a coil 342 wound on the core 341. The coil 342 forms an electric field when external power is applied to the coil 342, thus rotating the rotor casing 360. The rotating shaft 350 is rotatably inserted into the bearing 330 and supports the rotor casing 360 upwards.

A magnet 361 is secured to the inner circumferential wall of the rotor casing 360 and faces the armature 240 to generate rotating force. Further, the disk clamping device 100 is provided on the upper portion of the rotor casing 360 to hold the optical disk 160.

[First Embodiment]

As shown in FIGS. 1 to 4, the disk clamping device 100 according to the first embodiment of the present invention includes a turntable 110, a hub 120, a guide unit 130, a spring 140 and a chucking plate 150.

Figure 2:
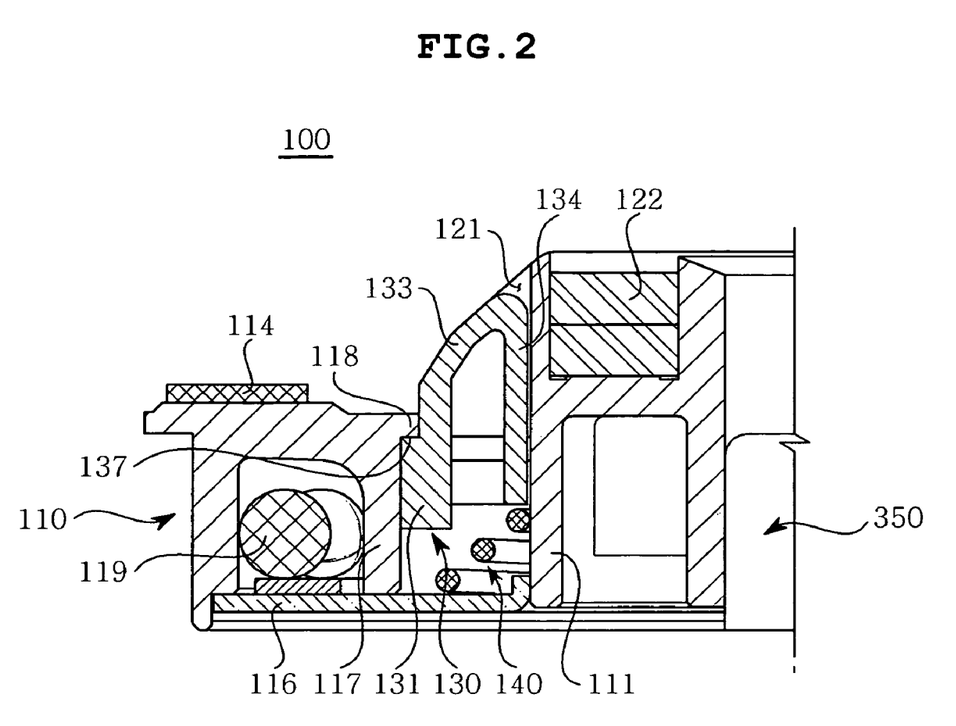
FIG. 2 is an enlarged sectional view illustrating important parts of the disk clamping device of FIG. 1.
Figure 3:
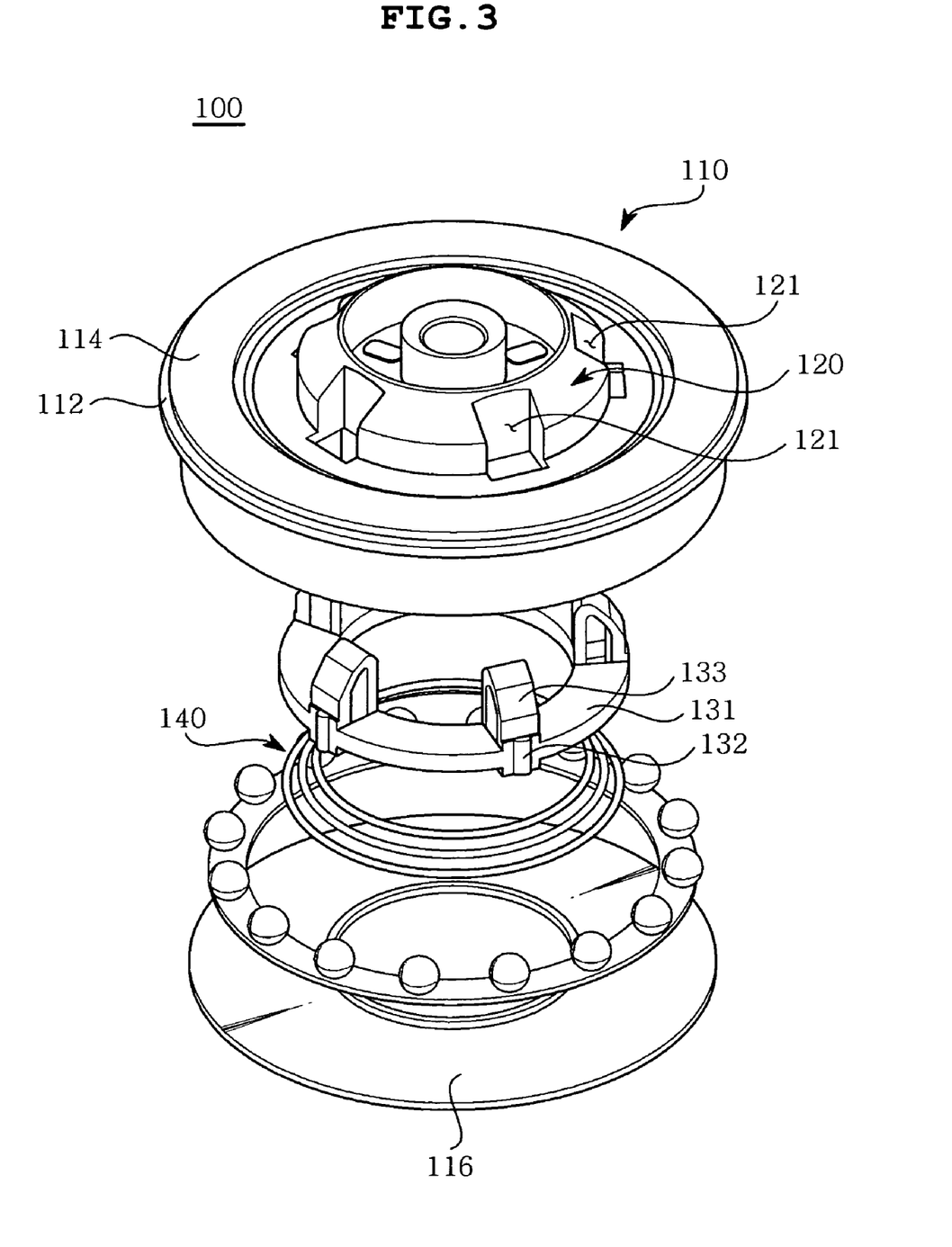
FIG. 3 is an exploded perspective view illustrating the disk clamping device of FIG. 1.

The turntable 110 functions to seat the optical disk 160 thereon. A coupling holder 111 is provided in the central portion of the turntable 110 so that the rotating shaft 350 is inserted into the coupling holder 111. A seat 112 extends from the coupling holder 111 perpendicularly to the rotating shaft 350, so that the optical disk 160 is seated on the seat 112. A shaft insert hole 113 is formed in the coupling holder 111 so that the rotating shaft 350 is inserted into the shaft insert hole 113. A rubber ring 114 is attached to the edge of the seat 112 to prevent the slipping of the optical disk 160.

Meanwhile, according to this embodiment, the turntable 110 accommodates the guide unit 130 which moves up and down linearly in the axial direction of the rotating shaft 350. In order to guide the linear motion of the guide unit 130, a ring-shaped guide hole 115 is formed outside the coupling holder 111. The lower portion of the turntable 110 is closed by a cover 116. That is, as shown in FIG. 2, the guide hole 115 into which the guide unit 130 is inserted is formed by the outer wall of the coupling holder 111, an inner wall 117 extending in the axial direction of the turntable 110 and the cover 116, and the upper portion of the guide hole 115 communicating with the openings 121 of the hub 120. Further, the turntable 110 has a protruding part 118 which protrudes towards the guide hole 115 to support the step 137 of the guide unit 130, thus preventing the removal of the guide unit 130.

Further, the turntable 110 is provided with a plurality of balls 119 to prevent the eccentricity of the turntable 110 when the turntable 110 rotates. During the rotation of the turntable 110, the plurality of balls 119 of the turntable 110 is evenly dispersed by centrifugal force, thus preventing the eccentricity or shaking of the turntable 110.

The hub 120 protrudes from the central portion of the turntable 110 to be inserted into the central hole 161 of the optical disk 160. The openings 121 are formed in the hub 120 at regular intervals to correspond to the guide unit 130, thus allowing the upper portion of the guide unit 130 to protrude out of the hub 120. That is, the upper portion of the guide unit 130 protrudes out of the hub 120 through the openings 121, thus supporting part of the underside of the optical disk 160.

Here, the openings 121 may comprise three or more openings which are formed at regular intervals around the center of the hub 120. According to this embodiment, five openings 121 are formed at regular intervals. Further, a ring-shaped magnet 122 is installed in the hub 120 to generate attractive force between the magnet 122 and the chucking plate 150. By the attractive force between the magnet 122 and the chucking plate 150, the optical disk 160 can be stably secured to the turntable 110.

Meanwhile, in order to clarify the construction of this embodiment, the turntable 110 and the hub 120 have been separately described. However, actually, the turntable 110 and the hub 120 are manufactured into a single structure through injection molding using a resin such as plastics.

Figure 4:
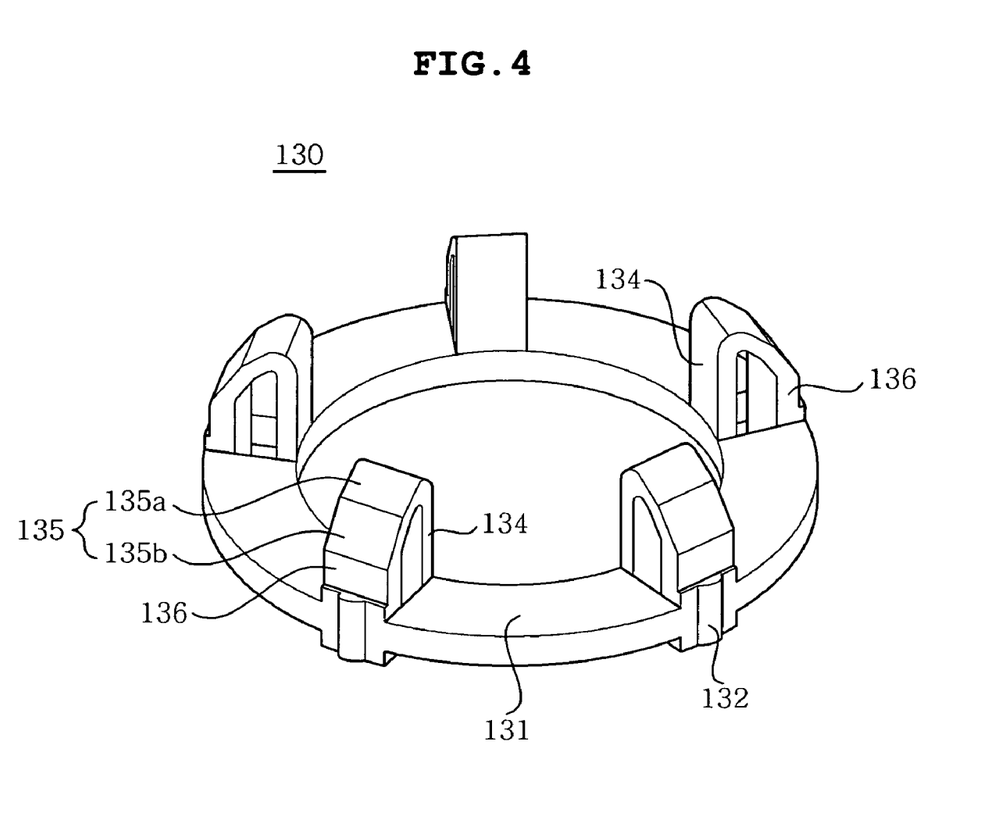
FIG. 4 is an enlarged perspective view illustrating the guide unit of FIG. 1.

The guide unit 130 supports part of the optical disk 160 so as to prevent the slipping or eccentricity of the optical disk 160. The guide unit 130 is inserted into the guide hole 115 of the turntable 110 in such a way as to move linearly in the axial direction of the rotating shaft 350. As shown in FIGS. 2 to 4, the guide unit 130 includes a body part 131 which is inserted into the guide hole 115, and support parts 133 which protrude outward through the openings 121 of the hub 120, thus supporting the optical disk 160.

The body part 131 has the shape of a ring, and projections 132 are provided on the outer circumference of the body part 131 to contact the inner wall 117 of the turntable 110. The projections 132 function to reduce frictional force between the guide unit 130 and the turntable 110 when the guide unit 130 moves linearly up and down. The projections 132 are provided on the corresponding support parts 133 in such a way as to protrude from the outer circumference of the body part 131 and extend in the axial direction of the rotating shaft 350. Further, the step 137 on which the projections 132 of the body part 131 are formed is supported by the protruding part 118 which protrudes towards the guide hole 115, thus preventing the removal of the guide unit 130.

The support parts 133 are formed at regular intervals on the body part 131 in such a way as to be at right angles to the body part 131. According to this embodiment, five support parts are formed at regular intervals to correspond to the number of the openings 121 formed in the hub 120.

Meanwhile, as shown in FIG. 4, each support part 133 includes a holder support 134, an inclined part 135 and an outer circumferential part 136. The holder support 134 is provided on the inner circumference of the body part 131 in such a way as to be perpendicular to the body part 131, and is in close contact with the coupling holder 111. The inclined part 135 is formed obliquely from an end of the holder support 134 to the body part 131. The outer circumferential part 136 couples an end of the inclined part 135 with the body part 131.

The holder support 134 is in close contact with the outer circumference of the coupling holder 111 extending in the axial direction, and is slidably coupled to the coupling holder 111 to guide the axial linear motion of the support part 133 during the insertion of the optical disk 160.

Figure 5:
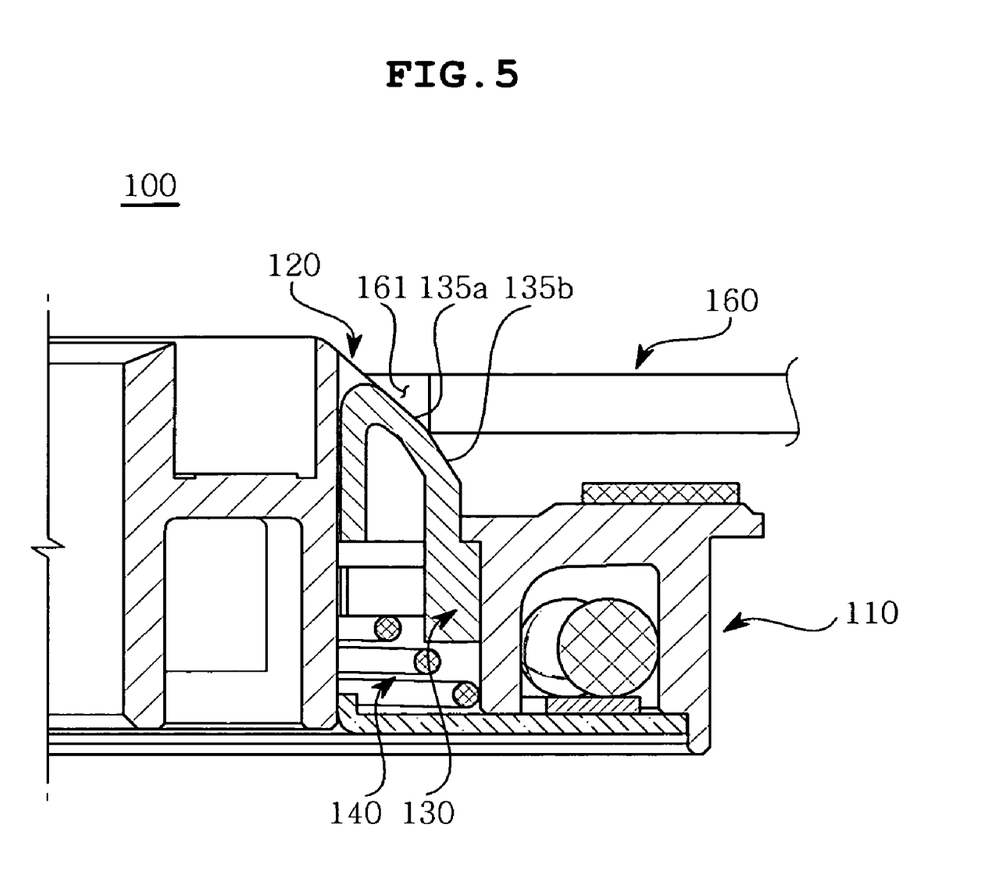
FIGS. 5 and 6 are enlarged sectional views illustrating the process of mounting an optical disk on the disk clamping device of the present invention.

As shown in FIG. 4, the inclined part 135 includes two inclined surfaces having different slopes, namely, a first inclined surface 135a extending from an end of the holder support 134 and a second inclined surface 135b extending from the first inclined surface 135a to the outer circumferential part 136. Here, the first inclined surface 135a is formed to be inserted into the central hole 161 of the optical disk 160, and the second inclined surface 135b is formed to support the lower surface of the optical disk 160. That is, as shown in FIG. 5, the portion in which the central hole 161 of the optical disk 160 is formed is in close contact with the second inclined surface 135b when the optical disk 160 is inserted.

The outer circumferential part 136 is formed to be perpendicular to the body part 131, and couples the second inclined surface 135b of the inclined part 135 with the body part 131.

According to this embodiment, the holder support 134 of the guide unit 130 slides while being in surface contact with the coupling holder 111, thus stably guiding the linear motion using the mounting force of the optical disk 160. When the guide unit 130 moves linearly, the projections 132 slide against the inner wall 117 of the turntable 110 while being in point or line contact with the inner wall 117, thus reducing frictional force between the guide unit 130 and the turntable 110 during the linear motion of the guide unit 130.

Meanwhile, in order to clarify the construction of this embodiment, the body part 131 and the support parts 133 of the guide unit 130 have been separately described. However, actually, the guide unit 130 is manufactured to have a single structure using a resin such as plastics.

The spring 140 elastically biases the guide unit 130 in a direction opposite to the mounting direction of the optical disk 160, and is placed between the lower portion of the guide unit 130 and the cover 116 of the turntable 110 to elastically support the guide unit 130. That is, since the guide unit 130 is elastically supported by the spring 140, elastic force is continuously applied to the optical disk 160 which is in close contact with the second inclined surface 135b of the guide unit 130.

The chucking plate 150 presses the upper surface of the optical disk 160 seated on the turntable 110, thus securing the optical disk 160 to the turntable 110. The chucking plate 150 is manufactured using a magnetic material such as a steel plate so as to generate attractive force between the chucking plate 150 and the magnet 122 installed in the hub 120. However, the chucking plate 150 may be manufactured using a resin such as plastics. In this case, a magnetic material is additionally provided on the chucking plate 150 to generate attractive force with respect to the magnet 122.

[Second Embodiment]

Figure 7:
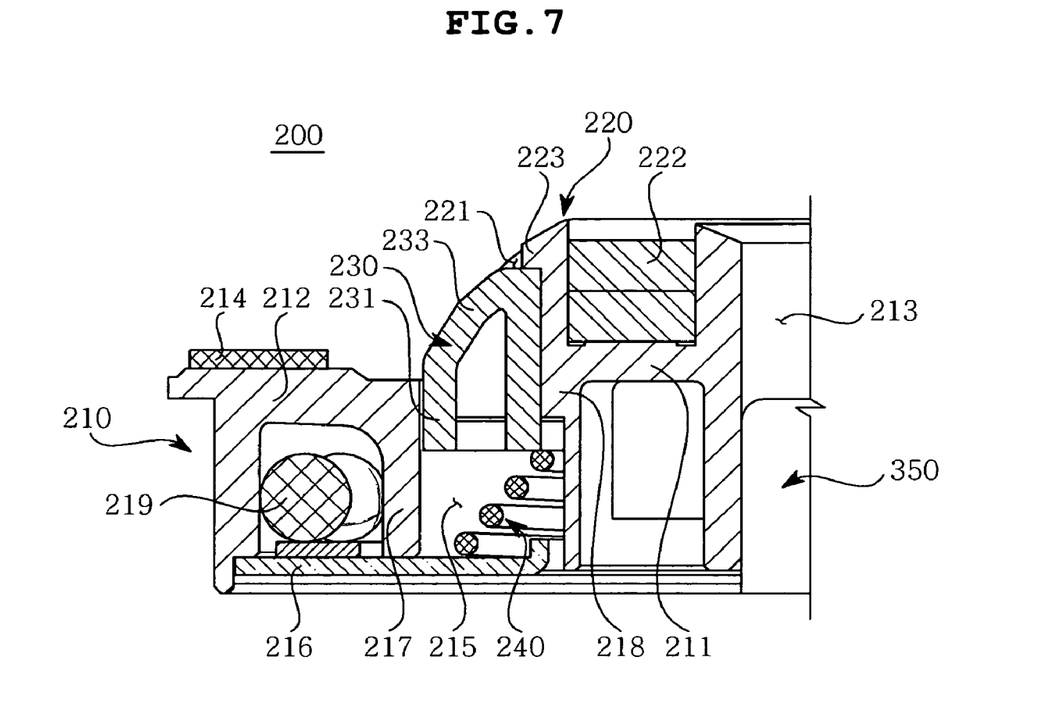
FIG. 7 is an enlarged sectional view illustrating important parts of a disk clamping device according to a second embodiment of the present invention.
Figure 8:
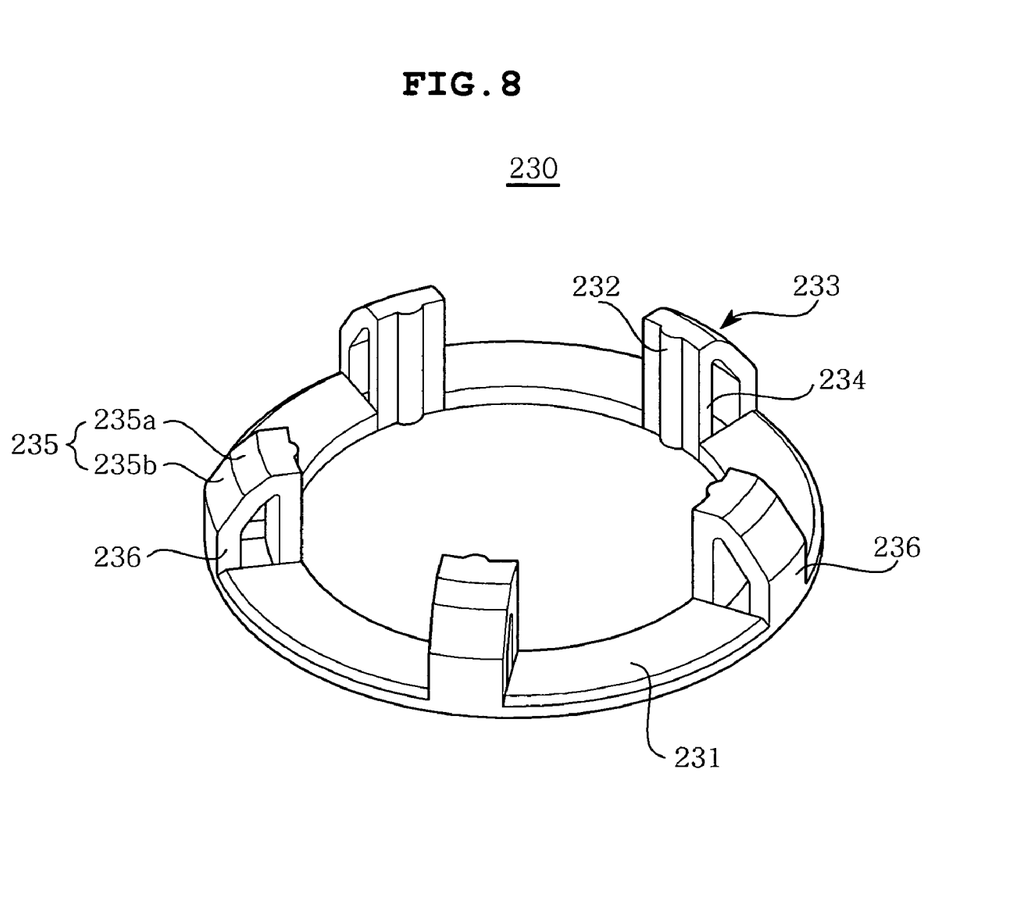
FIG. 8 is an enlarged perspective view illustrating the guide unit of FIG. 7.

As shown in FIGS. 7 and 8, the disk clamping device 200 according to the second embodiment of the present invention includes a turntable 210, a hub 220, a guide unit 230, a spring 240 and a chucking plate 250. Those elements common to both the first and second embodiments will not be described herein.

The turntable 210 functions to seat an optical disk 160 thereon. A coupling holder 211 is provided on the central portion of the turntable 200 so that a rotating shaft 350 is inserted into the coupling holder 211. A seat 212 extends from the coupling holder 211 at right angles to the rotating shaft 350, so that the optical disk 160 may be seated on the seat 212. A shaft insert hole 213 is formed in the coupling holder 211 so that the rotating shaft 350 is inserted into the shaft insert hole 213. A rubber ring 214 is attached to the edge of the seat 212 to prevent the slipping of the optical disk 160.

Meanwhile, according to this embodiment, the turntable 210 accommodates the guide unit 230 which linearly moves up and down in the axial direction of the rotating shaft 350. A ring-shaped guide hole 215 is formed outside the coupling holder 211 to guide the linear motion of the guide unit 230. The lower portion of the turntable 210 is closed by a cover 216. That is, as shown in FIG. 8, the guide hole 215 into which the guide unit 230 is inserted is formed by the outer wall 218 of the coupling holder 211, an inner wall 217 extending in the axial direction of the turntable 210 and the cover 216, and the upper portion of the guide hole 215 communicates with the openings 221 of the hub 220.

Further, the turntable 210 is provided with a plurality of balls 219 to prevent the eccentricity of the turntable 210 when the turntable 210 rotates. During the rotation of the turntable 210, the plurality of balls 219 of the turntable 210 is evenly dispersed by centrifugal force, thus preventing the eccentricity or shaking of the turntable 210.

The hub 220 protrudes from the central portion of the turntable 210 to be inserted into the central hole 161 of the optical disk 160. Openings 221 are formed in the hub 220 at regular intervals to correspond to the guide unit 230, thus allowing the upper portion of the guide unit 230 to protrude out of the hub 220. That is, the upper portion of the guide unit 230 protrudes out of the hub 220 through the openings 221, thus supporting part of the underside of the optical disk 160. Here, the openings 221 may comprise three or more openings which are formed at regular intervals around the center of the hub 220. According to this embodiment, five openings 221 are formed at regular intervals. Further, a ring-shaped magnet 222 is installed in the hub 220 to generate attractive force between the magnet 222 and the chucking plate 250. Because of the attractive force between the magnet 222 and the chucking plate 250, the optical disk 160 can be stably secured to the turntable 210.

Further, the hub 220 has a protruding part 223 which protrudes towards the openings 221 to support the upper surface of the guide unit 230, thus preventing the removal of the guide unit 230. That is, according to this embodiment, the protruding part 223 is integrally provided on the upper portion of the hub 220 in such a way as to protrude towards the openings 221, thus supporting the guide unit 230 and preventing the removal of the guide unit 230. Hence, the shape of the guide unit 230 is different from that of the guide unit according to the first embodiment of the present invention.

The guide unit 230 supports part of the optical disk 160 so as to prevent the slipping or eccentricity of the optical disk 160. The guide unit 230 is inserted into the guide hole 215 of the turntable 210 in such a way as to move linearly in the axial direction of the-rotating shaft 350. As shown in FIGS. 7 and 8, the guide unit 230 according to the second embodiment of the present invention includes a body part 231 which is inserted into the guide hole 215, and support parts 233 which protrude outward through the openings 221 of the hub 220 to support the optical disk 160.

The body part 231 has the shape of a ring. The support parts 233 protrude from the body part 231 in such a way as to be at right angles to the-upper surface of the body part 231.

The plurality of support parts 233 are formed at regular intervals on the body part 231 in such a way as to be at right angles to the body part 231. According to this embodiment, five support parts are formed at regular intervals to correspond to the number of the openings 221 formed in the hub 220.

Further, each support part 233 has a projection 232 which is in contact with the outer wall 218 of the coupling holder 211. The projection 232 functions to reduce frictional force between the guide unit 230 and the turntable 210 when the guide unit 230 linearly moves up and down. The projection 232 is provided on the inside portion of each support part 233, that is, a surface facing the outer wall 218 of the coupling holder 211 in such a way as to extend in the axial direction of the rotating shaft 350. Unlike the first embodiment, the guide unit 230 according to the second embodiment of the present invention may omit the step 137 which prevents the removal of the guide unit. Further, the guide unit 230 of this embodiment is constructed so that its upper surface is supported by the protruding part 223 provided on the hub 220.

Meanwhile, as shown in FIG. 8, each support part 233 includes a holder support 234, an inclined part 235 and an outer circumferential part 236. The holder support 234 is provided on the inner circumference of the body part 231 in such a way as to be perpendicular to the body part 231, and is provided with the projection 232. The inclined part 235 is formed obliquely from an end of the holder support 234 to the body part 231. The outer circumferential part 236 couples an end of the inclined part 235 with the body part 231.

The holder support 234 faces the outer wall 218 of the coupling holder 211 which extends in the axial direction, and the projection 232 is in line or point contact with the outer wall 218 of the coupling holder 211, so that frictional force is reduced.

As shown in FIG. 8, the inclined part 235 includes two inclined surfaces having different slopes, namely, a first inclined surface 235a extending from an end of the holder support 234 and a second inclined surface 235b extending from the first inclined surface 235a to the outer circumferential part 236. Here, the first inclined surface 235a is formed to be inserted into the central hole 161 of the optical disk 160, and the second inclined surface 235b is formed to support the lower surface of the optical disk 160. That is, as shown in FIG. 8, the portion in which the central hole 161 of the optical disk 160 is formed is in close contact with the second inclined surface 235b when the optical disk 160 is inserted.

The outer circumferential part 236 is formed to be perpendicular to the body part 231, and couples the second inclined surface 235b of the inclined part 235 with the body part 231.

According to this embodiment, each projection 232 of the guide unit 230 is in point or line contact with the outer wall 218 of the coupling holder 211 to slide therealong, thus reducing frictional force between the guide unit 230 and the turntable 210 during the linear motion of the guide unit 230. Further, when the guide unit 230 moves linearly, the outer circumferential part 236 is in surface contact with the inner wall 217 of the turntable 210 to slide along the inner wall 217, thus stably guiding the linear motion of the guide unit 230 using the mounting force of the optical disk 160.

Meanwhile, in order to clarify the construction of this embodiment, the body part 231 and the support parts 233 of the guide unit 230 have been separately described. However, actually, the guide unit 230 is manufactured to be of a single structure using a resin such as plastics.

The process of inserting the optical disk 160 into the clamping device 100 or 200 according to the preferred embodiment of the present invention will be described with reference to FIGS. 5 and 6 which illustrate the clamping device 100 of the first embodiment. The process of inserting the optical disk 160 into the clamping device 200 according to the second embodiment of the present invention is substantially similar to the process of the first embodiment.

As shown in FIG. 5, the optical disk 160 is mounted to the turntable 110 of the clamping device 100. The hub 120 is inserted into the central hole 161 of the optical disk 160. At this time, each second inclined surface 135b of the guide unit 130 supports the optical disk 160.

Figure 6:
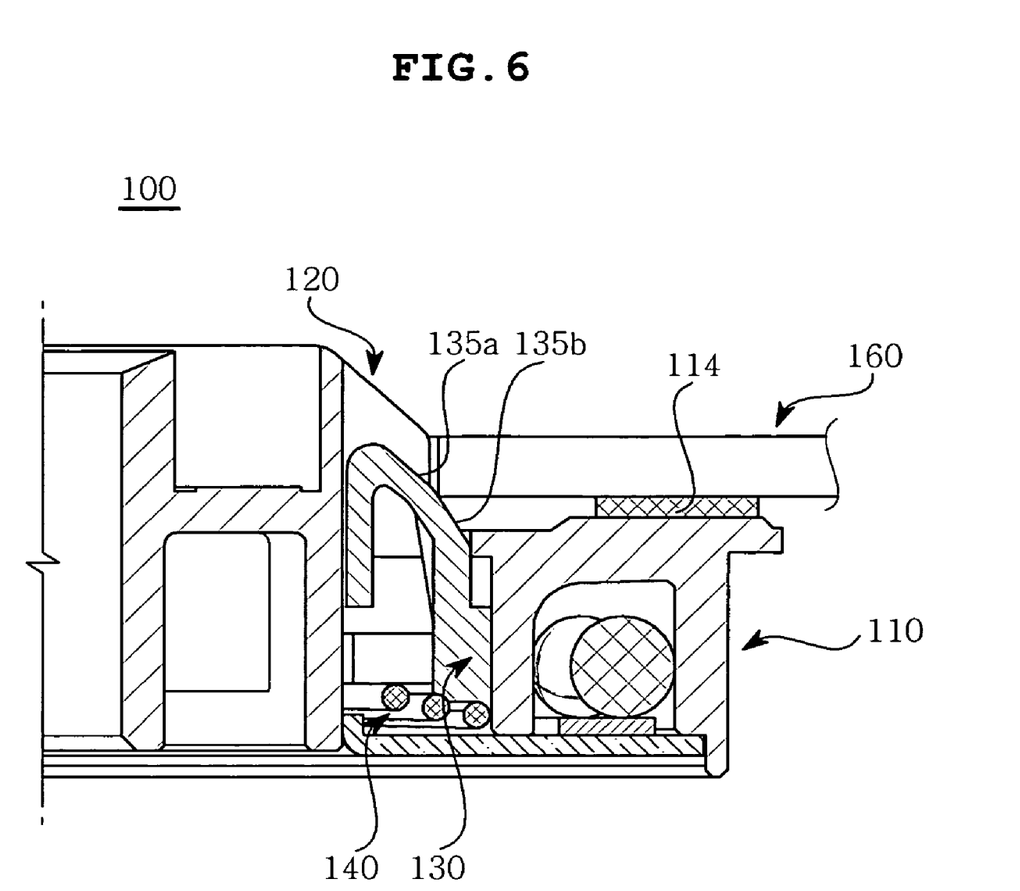

As shown in FIG. 6, when the mounting force of the optical disk 160 is applied to the guide unit 130, the guide unit 130 moves linearly to the cover 116 of the turntable 110 while compressing the spring 140, and the optical disk 160 is seated on the rubber ring 114 of the turntable 110. Afterwards, the upper portion of the optical disk 160 is pressed by the chucking plate 150, so that the optical disk 160 is secured to the turntable 110. Meanwhile, even after the optical disk 160 has been mounted, the second inclined surfaces 135b of the guide unit 130 are in close contact with the optical disk 160, so that the elastic force of the spring 140 is continuously applied to the optical disk 160. Because of the elastic force of the spring 140 and the guide unit 130, additional coupling force is applied to the optical disk 160 in the axial direction of the rotating shaft 350 and a direction perpendicular to the axial direction. When the optical disk 160 is supported by the additional coupling force, the slipping or eccentricity of the optical disk 160 can be prevented when the turntable 110 rotates at high speeds.

As described above, the present invention provides a disk clamping device, in which part of the lower surface of an optical disk seated on a turntable is in close contact with and supported by the second inclined surfaces of a guide unit, so that the elastic force of a spring elastically biasing the guide unit is continuously applied to the optical disk, thus preventing the slipping or eccentricity of the optical disk when the turntable rotates at high speeds.

Further, the inner wall of a turntable and the projections of a guide unit are in point or line contact with each other, so that frictional force between the guide unit and the turntable can be reduced during the linear motion of the guide unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A disk clamping device, comprising:
   a turntable having a hub integrally provided in a central portion thereof, the hub being inserted into a central hole of an optical disk;
   a guide unit accommodated in the turntable in such a way as to move linearly, at least portion of the guide unit protruding outwards from the hub and supported by the optical disk, the guide unit being moved linearly by mounting force of the optical disk;
   a spring provided in the turntable to elastically bias the guide unit in a direction opposite to a direction of insertion of the optical disk; and
   a chucking plate pressing an upper surface of the optical disk seated on the turntable, thus securing the optical disk to the turntable,
   wherein the turntable comprises:
      a coupling holder secured to a rotating shaft of a spindle motor;
      an inner wall provided to be spaced apart from the coupling holder and a guide hole formed between the inner wall and the coupling holder so that the guide unit is inserted into the guide hole; and
      a cover for sealing a lower portion of the turntable, and
   wherein the guide unit comprises:
      a ring-shaped body part inserted into the guide hole; and
      a support part provided perpendicularly to the body part, at least portion of the support part protruding out of the hub to support the optical disk.

2. The disk clamping device as set forth in claim 1, wherein at least portion of the guide unit is in point or line contact with the turntable so as to reduce frictional force between the guide unit and the turntable when the guide unit is moved linearly by the optical disk.

3. The disk clamping device as set forth in claim 1, wherein the inner wall is in point or line contact with the guide unit, thus reducing frictional force.

4. The disk clamping device as set forth in claim 3, wherein the body part comprises a projection which protrudes from an outer circumference of the body part and is in point or line contact with the inner wall of the turntable.

5. The disk clamping device as set forth in claim 1, wherein the turntable comprises:
   a coupling holder secured to a rotating shaft of a spindle motor;
   an inner wall provided to be spaced apart from the coupling holder, a guide hole formed between the inner wall and the coupling holder so that the guide unit is inserted into the guide hole; and
   a cover for sealing a lower portion of the turntable,
   wherein the coupling holder is in point or line contact with the guide unit, thus reducing frictional force.

6. The disk clamping device as set forth in claim 5, wherein the guide unit comprises:
   a ring-shaped body part inserted into the guide hole; and
   a support part provided to be perpendicular to the body part, at least portion of the support part protruding out of the hub to support the optical disk,
   wherein the support part comprises a projection which protrudes from an inner surface of the support part and is in point or line contact with the coupling holder of the turntable.

7. The disk clamping device as set forth in claim 4, wherein the support part comprises an inclined part which protrudes out of the hub to support the optical disk, the inclined part comprising:
   a first inclined surface inserted into the central hole of the optical disk; and
   a second inclined surface extending from the first inclined surface in such a way as to be in close contact with a portion of a lower surface of the optical disk.

8. The disk clamping device as set forth in claim 7, wherein the second inclined surface of the inclined part continuously applies elastic force of the spring to the optical disk which is pressed by the chucking plate and mounted to the turntable.

9. The disk clamping device as set forth in claim 7, wherein the projection is formed in such a way as to extend in an axial direction of the rotating shaft.

10. The disk clamping device as set forth in claim 7, wherein the support part comprises a plurality of support parts which are placed at regular intervals around the rotating shaft, and the hub comprises openings which are formed at regular intervals to correspond to the support parts, so that the support parts protrude out of the hub through the openings.

11. The disk clamping device as set forth in claim 10, wherein the plurality of support parts comprises at least three support parts which are placed around the rotating shaft at regular intervals.

12. The disk clamping device as set forth in claim 6, wherein the support part comprises an inclined part which protrudes out of the hub to support the optical disk, the inclined part comprising:
   a first inclined surface inserted into the central hole of the optical disk; and
   a second inclined surface extending from the first inclined surface in such a way as to be in close contact with a portion of a lower surface of the optical disk.

13. The disk clamping device as set forth in claim 12, wherein the second inclined surface of the inclined part continuously applies elastic force of the spring to the optical disk which is pressed by the chucking plate and mounted to the turntable.

14. The disk clamping device as set forth in claim 12, wherein the projection is formed in such a way as to extend in an axial direction of the rotating shaft.

15. The disk clamping device as set forth in claim 12, wherein the support part comprises a plurality of support parts which are placed at regular intervals around the rotating shaft, and the hub comprises openings which are formed at regular intervals to correspond to the support parts, so that the support parts protrude out of the hub through the openings.

16. The disk clamping device as set forth in claim 15, wherein the plurality of support parts comprises at least three support parts which are placed around the rotating shaft at regular intervals.

* * * * *